(12) United States Patent
Paik et al.

(10) Patent No.: US 8,213,969 B2
(45) Date of Patent: Jul. 3, 2012

(54) MOBILE TERMINAL FOR CHATTING BY USING SMS AND METHOD THEREOF

(75) Inventors: Seung-Hwa Paik, Seoul (KR); Kwang-Soo Seo, Seoul (KR); Youn-Pil Jeung, Seoul (KR); Ji-Woong Han, Seoul (KR)

(73) Assignee: KT Corporation, Seongnam (KR)

( * ) Notice: Subject to any disclaimer, the term of this patent is extended or adjusted under 35 U.S.C. 154(b) by 985 days.

(21) Appl. No.: 12/159,383

(22) PCT Filed: Feb. 1, 2007

(86) PCT No.: PCT/KR2007/000542
§ 371 (c)(1),
(2), (4) Date: Jun. 26, 2008

(87) PCT Pub. No.: WO2007/091800
PCT Pub. Date: Aug. 16, 2007

(65) Prior Publication Data
US 2009/0005089 A1    Jan. 1, 2009

(30) Foreign Application Priority Data
Feb. 6, 2006 (KR) .................. 10-2006-0011103

(51) Int. Cl.
*H04W 4/00* (2009.01)
(52) U.S. Cl. ........ 455/466; 455/513; 455/403; 715/758; 715/762; 715/751
(58) Field of Classification Search .............. 455/466, 455/513, 403; 715/758, 762, 751
See application file for complete search history.

(56) References Cited

U.S. PATENT DOCUMENTS

| | | | |
|---|---|---|---|
| 7,669,134 B1* | 2/2010 | Christie et al. ............. | 715/758 |
| 2001/0006889 A1* | 7/2001 | Kraft ........................... | 455/412 |
| 2003/0228909 A1* | 12/2003 | Tanaka et al. ................ | 463/42 |
| 2003/0234814 A1 | 12/2003 | Salminen et al. | |
| 2004/0039780 A1 | 2/2004 | Ho et al. | |
| 2007/0260724 A1* | 11/2007 | Rowley ....................... | 709/223 |

FOREIGN PATENT DOCUMENTS

| | | |
|---|---|---|
| CN | 1279571 A | 1/2001 |
| EP | 1063857 A2 | 12/2000 |
| EP | 1109415 A2 | 6/2001 |

(Continued)

Primary Examiner — Nimesh Patel

(57) ABSTRACT

The present invention relates to a mobile communication terminal that supports a text chatting function by using a short message service, and a text chatting service method. For this purpose, the present invention provides a mobile communication terminal including a program memory, a data storage unit, a key input unit, a display, and a microprocessor. The program memory stores a text chatting program for the text chatting service and a program that performs additional functions executed in the text chatting service. The data storage unit stores a text chatting message transmitted/received through the text chatting service. The key input unit includes a key button for generating the text chatting message. The display displays the transmitted/received text chatting message on a chatting window. The microprocessor executes the text chatting program and performs a control function to display text chatting messages communicated with a mobile communication terminal of a chatting contact on the chatting window. Herein, the text chatting message is transmitted/received by using a short message service. According to the present invention, a text chatting service using a short message service can be realized by simply changing a user interface of the mobile communication terminal so that a user can check a transmitted/received short message through one screen window, and provide a cost reduction by using a less expensive short message service than a data charge.

21 Claims, 11 Drawing Sheets

FOREIGN PATENT DOCUMENTS

| | | |
|---|---|---|
| EP | 1587288 A2 | 10/2005 |
| JP | 2001-223818 A | 8/2001 |
| JP | 2003-018660 | 1/2003 |
| JP | 2003-323380 A | 11/2003 |
| JP | 2004-362138 A | 12/2004 |
| JP | 2005-011290 A | 1/2005 |
| JP | 2005-018423 A | 1/2005 |
| JP | 2005-027198 A | 1/2005 |
| KR | 1020020078738 A | 10/2002 |
| KR | 1020030009000 A | 1/2003 |
| KR | 1020030056555 A | 7/2003 |
| KR | 1020040034260 A | 4/2004 |
| KR | 1020040067301 A | 7/2004 |
| KR | 1020050019669 A | 3/2005 |

* cited by examiner

[FIG. 1]
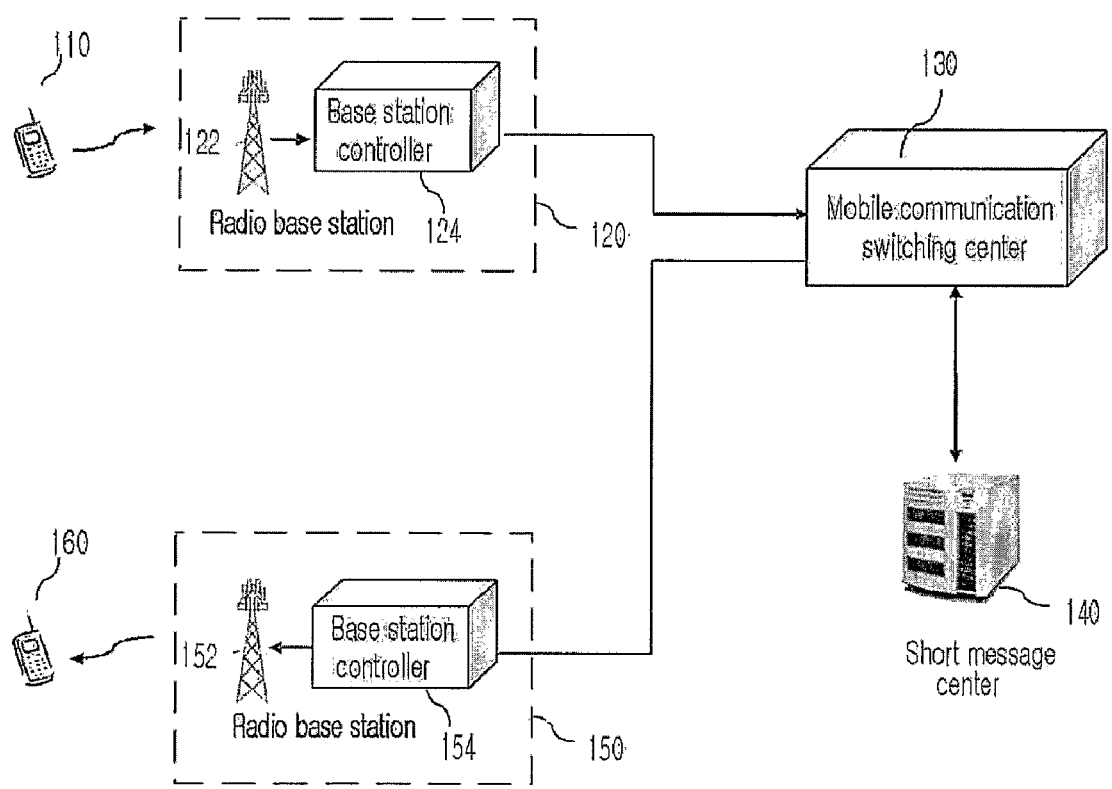

[FIG. 2]
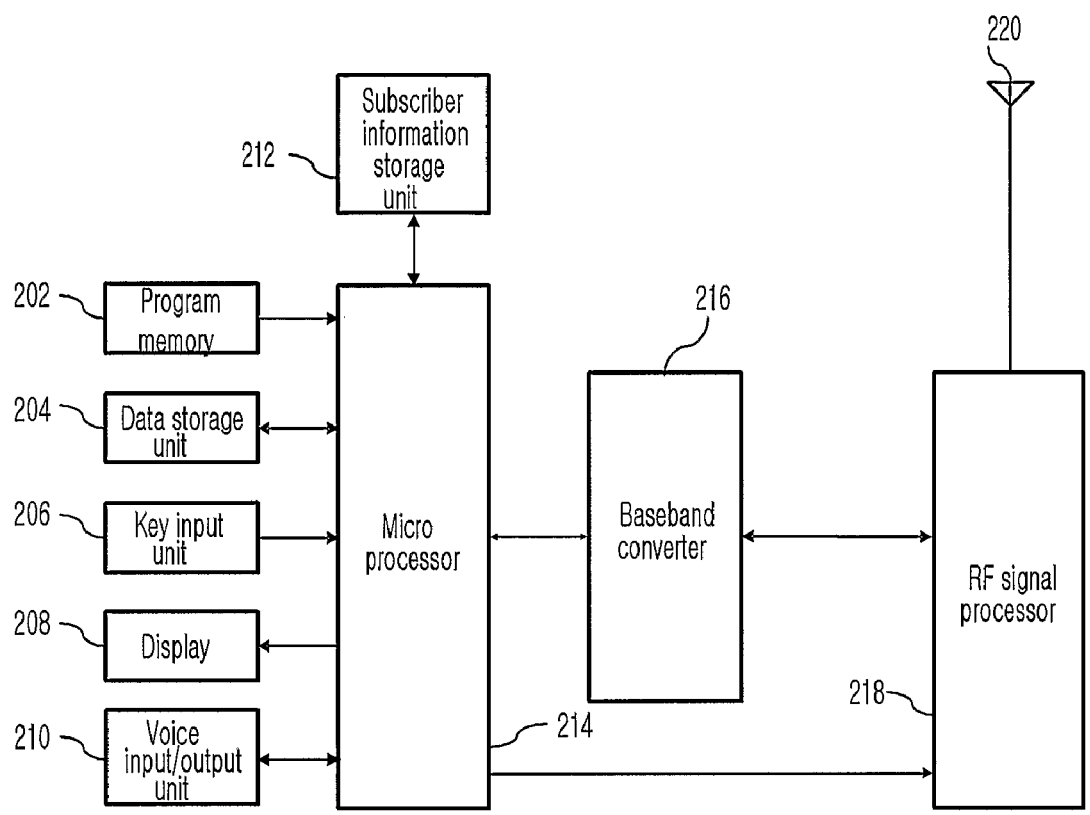

[FIG. 3]
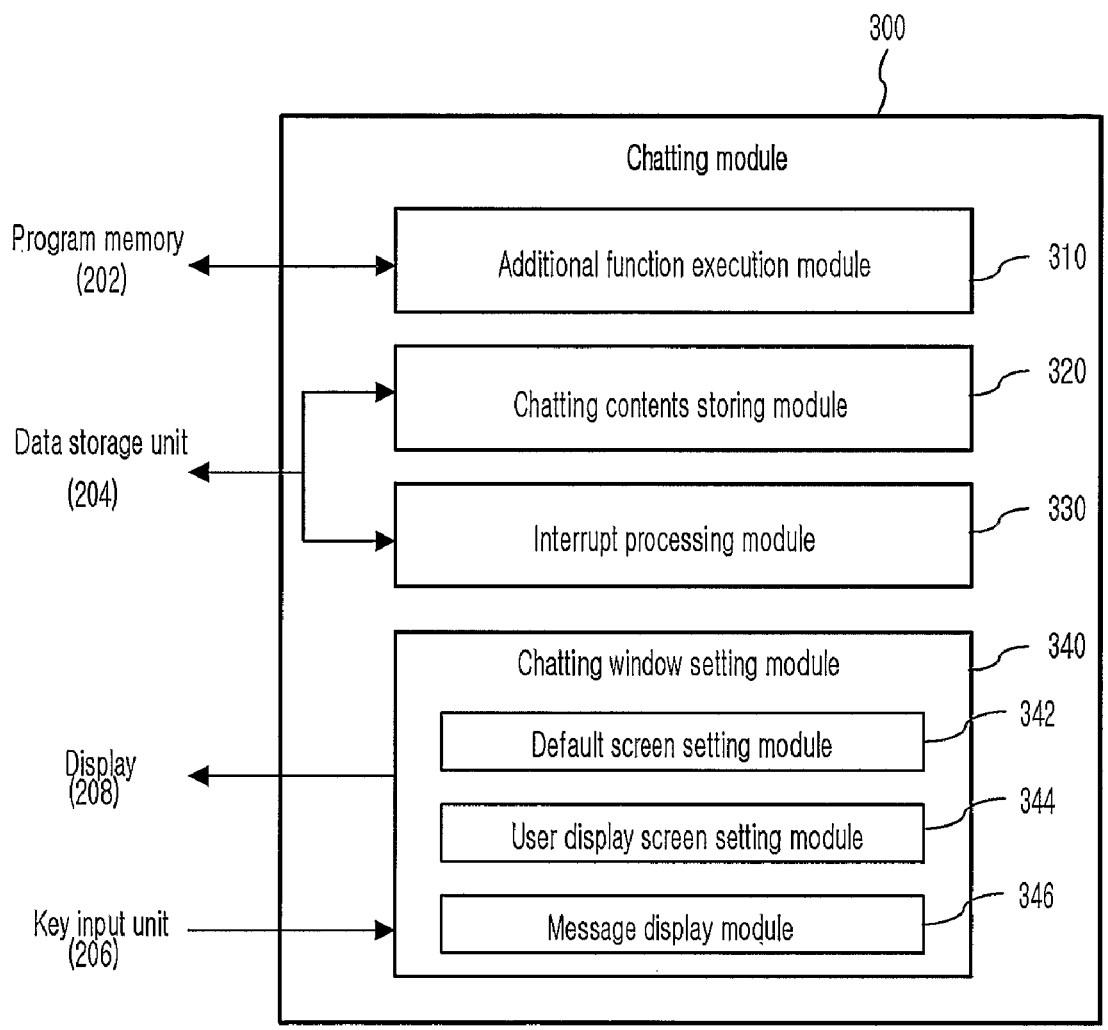

[FIG. 4]

| | Transmit chatting message | Receive chatting message | IDLE |
|---|---|---|---|
| Receive short message | Equal to a conventional short message processing method (display a short message arrival icon after receiving the short message) | Display short message arrival icon after receiving short message | Display short message arrival icon after receiving short message |
| Receive MMS receiving notification message (Pull) | Equal to a conventional multimedia message processing method display a multimedia message arrival icon after receiving the multimedia message) | Display multimedia message arrival icon after receiving multimedia message | Notify incoming, display multimedia message arrival icon after receiving multimedia message |
| Receive MMS receiving notification message (Push) | Equal to a conventional multimedia message processing method (draw out multimedia message) | Equal to a conventional multimedia message processing method (draw out multimedia message) | Enter a drawing out process of multimedia message |
| Receive multimedia message (WCDMA) | Simultaneous process | Simultaneous process | Continue receiving, display multimedia message arrival icon after receiving multimedia message |
| Receive multimedia message(1x/2G/EVDO) | Return to chatting window after processing voice incoming call | Simultaneous process | Continue receiving, display multimedia message arrival icon after receiving multimedia message |
| Voice call incoming | Display a pop-up message while receiving a multimedia message when "send" key is pressed | | |

[FIG. 5]
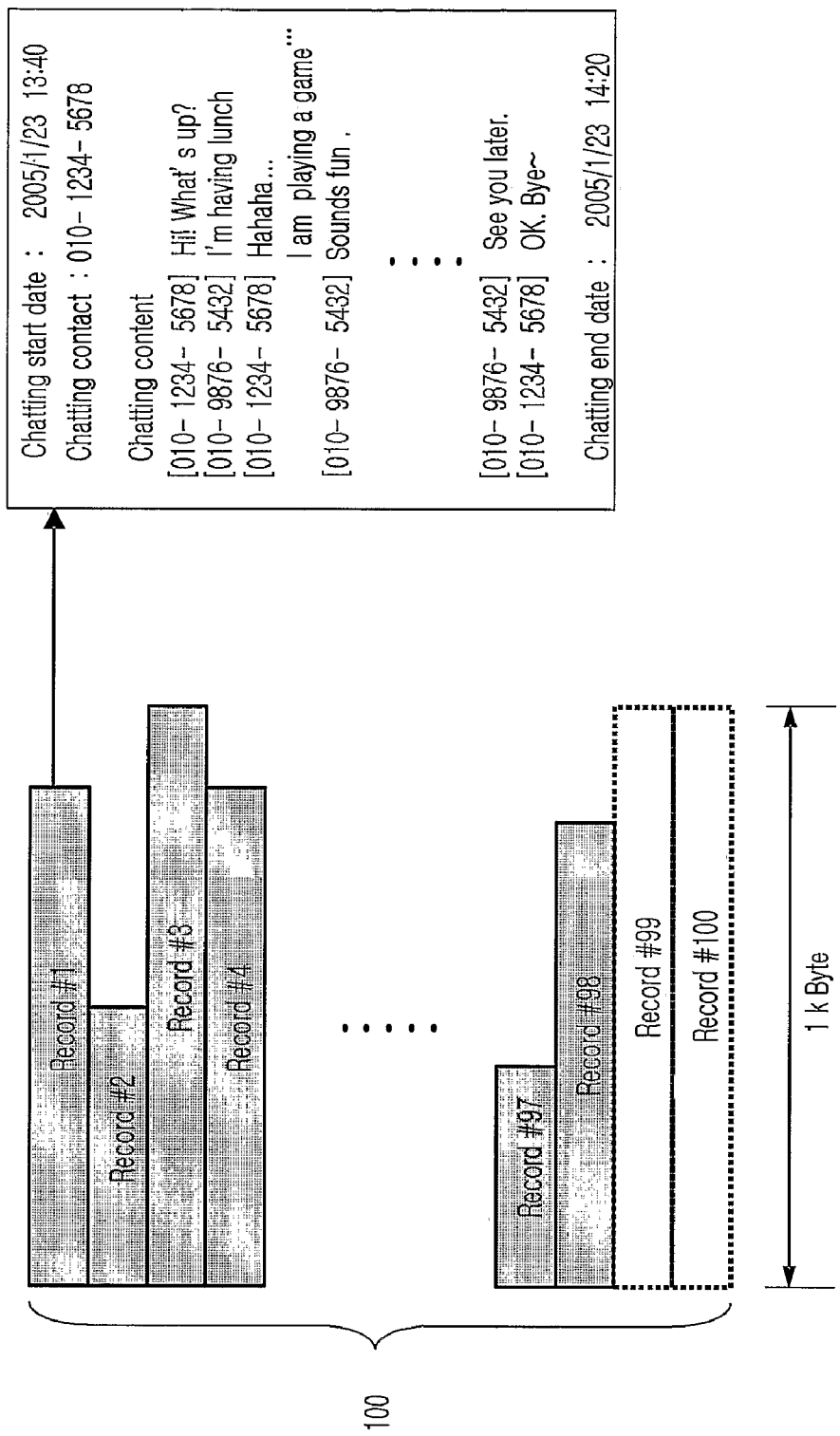

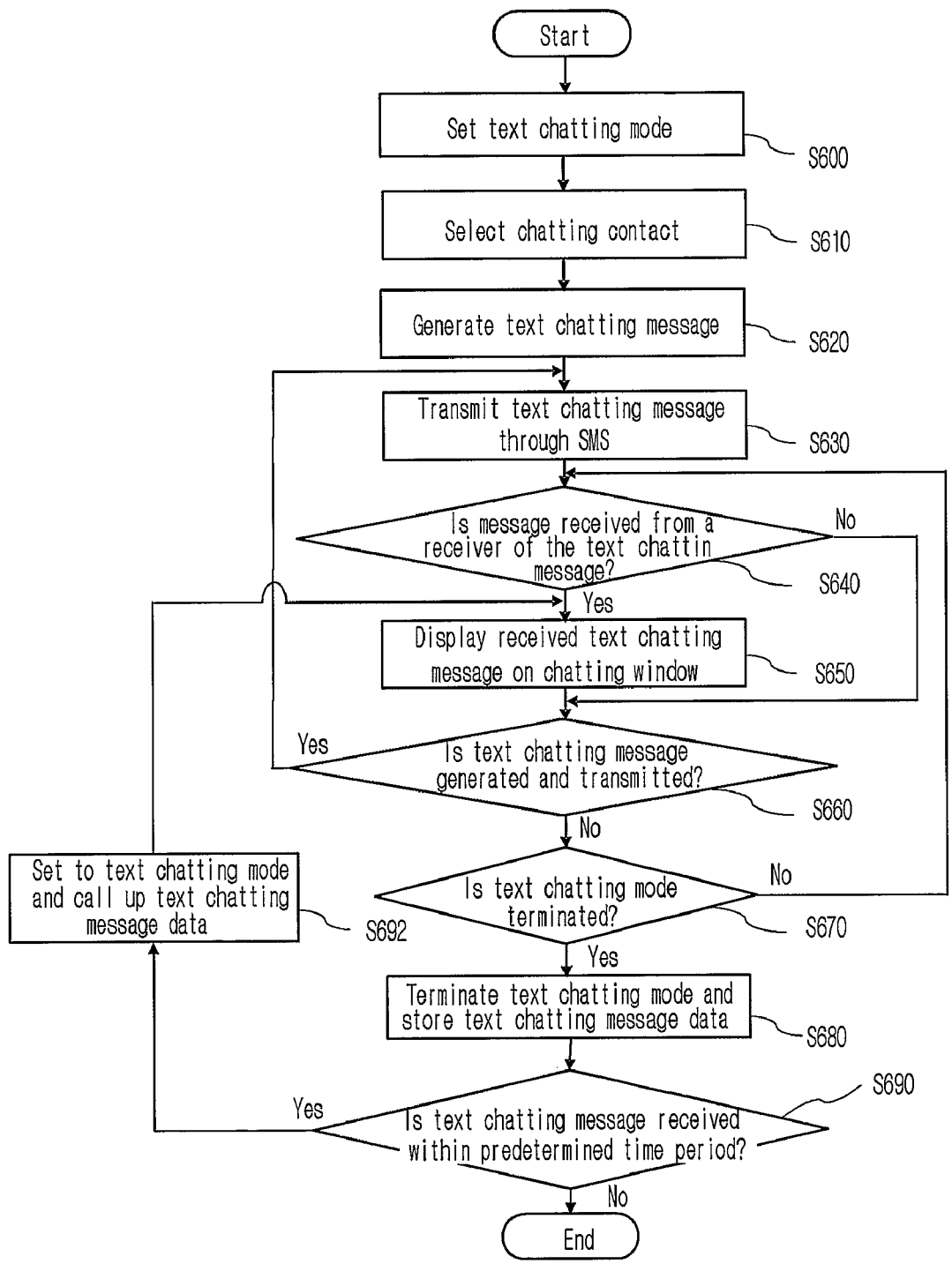
[FIG. 6]

[FIG. 7]
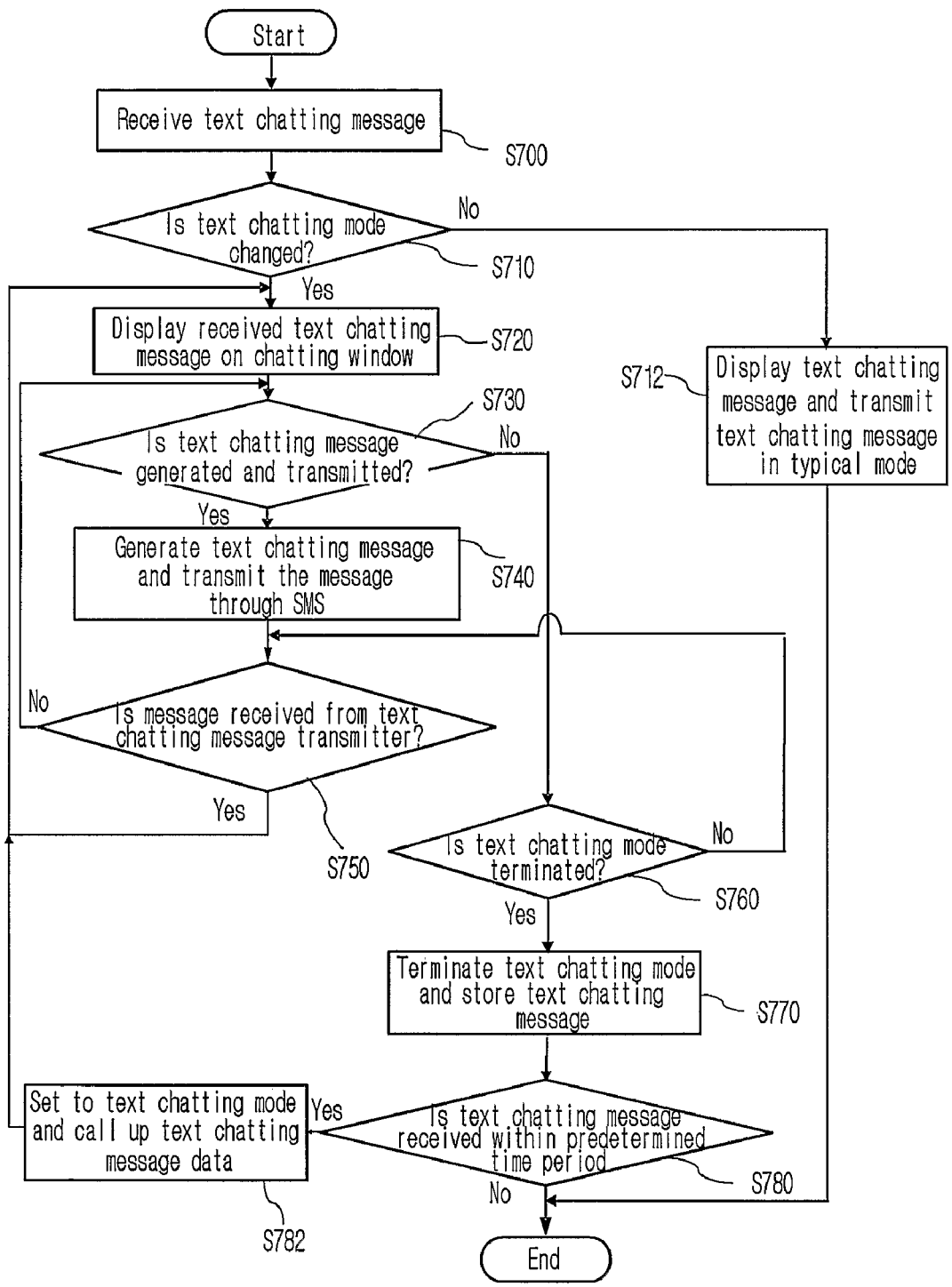

[FIG. 8]
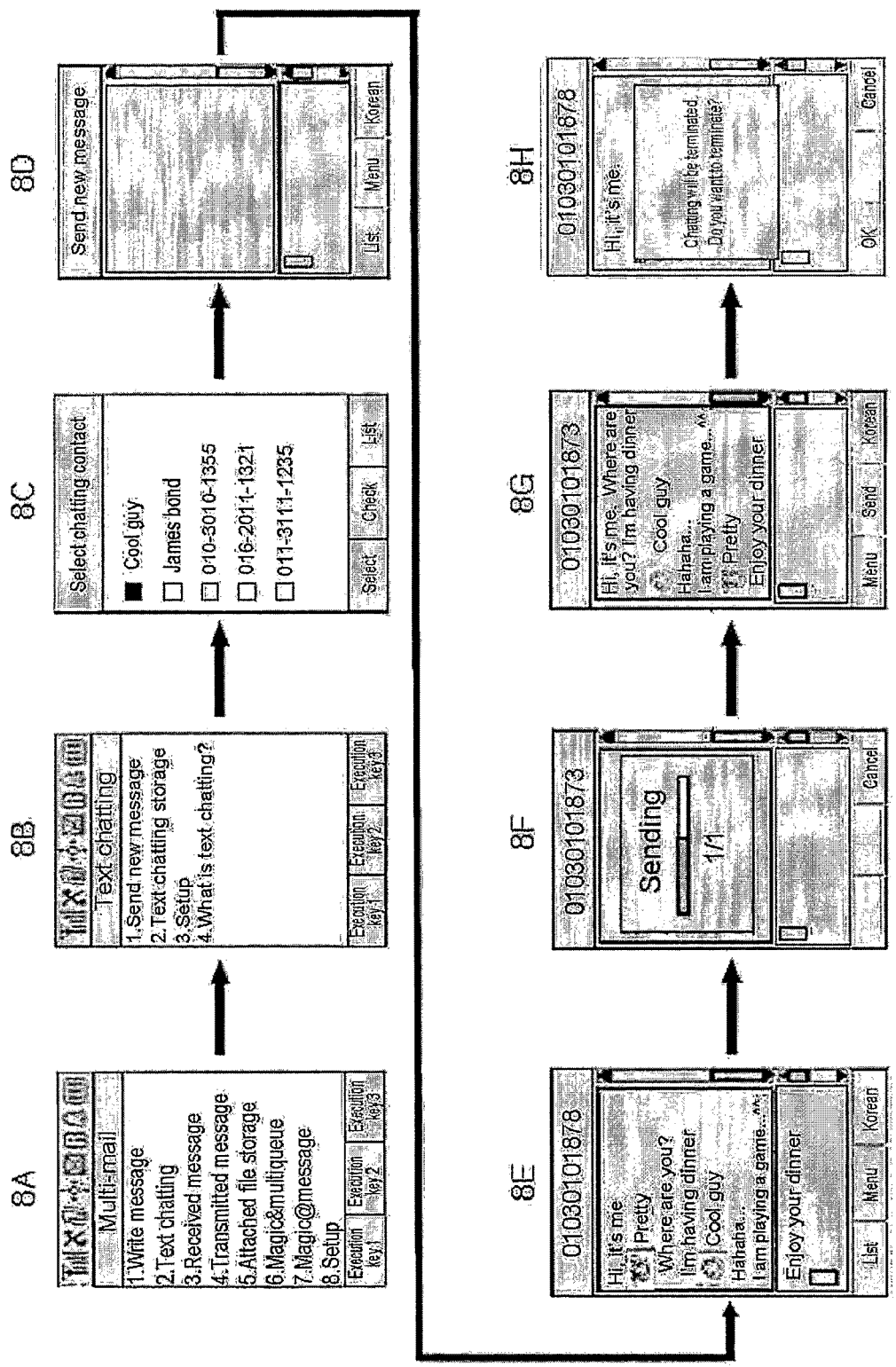

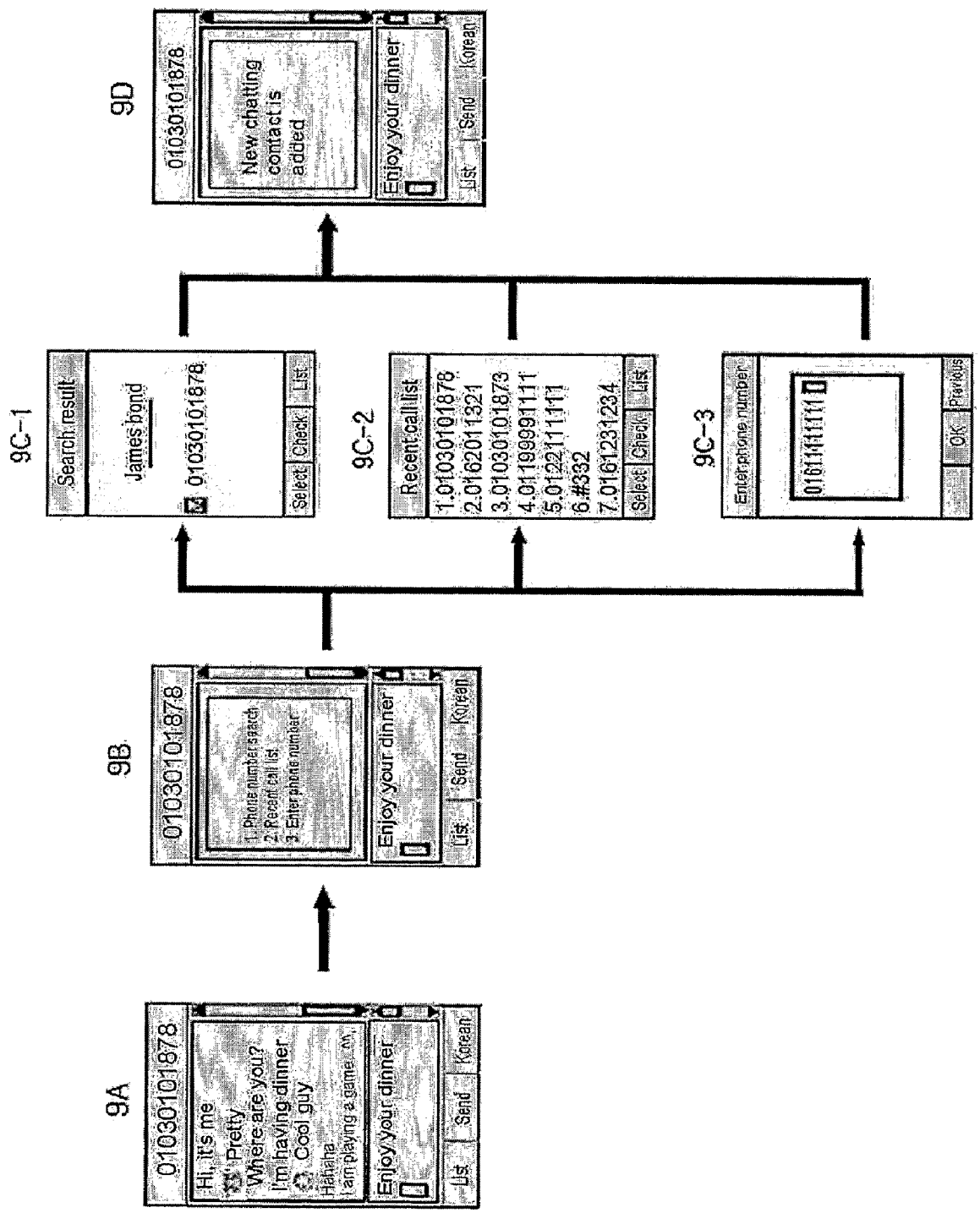
[FIG. 9]

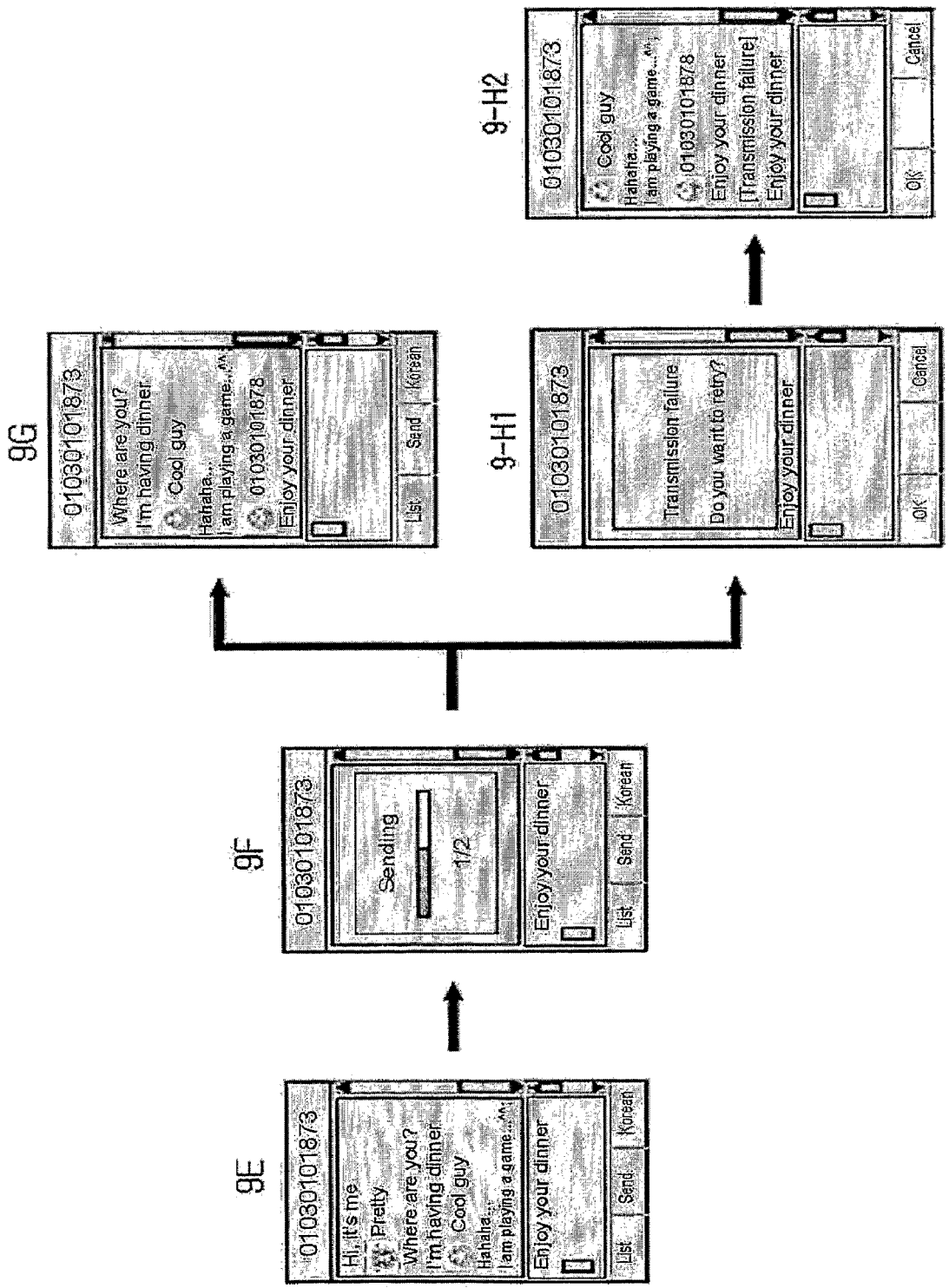
[FIG. 10]

[FIG. 11]
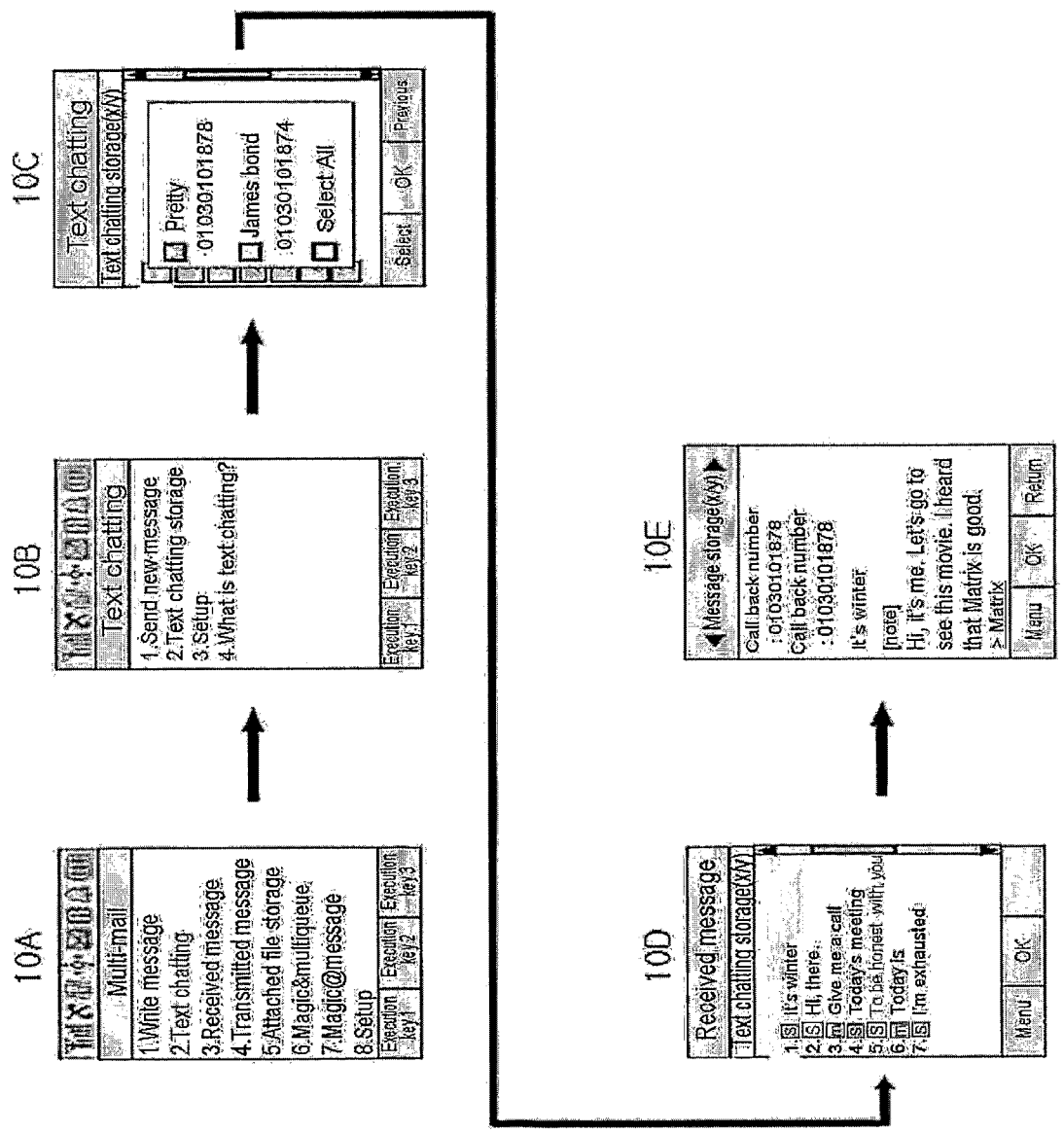

MOBILE TERMINAL FOR CHATTING BY USING SMS AND METHOD THEREOF

CROSS-REFERENCE TO RELATED APPLICATION

This application claims priority to and the benefit of Korean Patent Application No. 10-2006-0011103 filed in the Korean Intellectual Property Office on Feb. 6, 2006, the entire contents of which are incorporated herein by reference.

BACKGROUND OF THE INVENTION (a) Field of the Invention

The present invention relates to a mobile communication terminal that supports a chatting function using a short message service, and a chatting service method. More particularly, it relates to a mobile communication terminal having a user interface (UI) for providing a chatting service such as a messenger by using a short message service, and a chatting service method using the mobile communication terminal.

(b) Description of the Related Art

A mobile communication terminal is used as a portable telephone and for transmitting/receiving various information in the form of characters or images and receiving various information through a wireless Internet. In addition, the mobile communication terminal uses a short message service (SMS) to provide information between users, between a mobile communication service provider and a user, and between a company and a user.

The SMS is bi-directional and is capable of transmitting and receiving a short text message of approximately 80 bytes to 90 bytes regardless of a call between mobile communication terminals, and, unlike email, the SMS has a merit of transmitting a short text message to a recipient's mobile communication terminal almost simultaneously with a transmission time so that the population using a SMS is rapidly increasing.

The SMS basically transmits a recall number and a message between mobile communication terminals, and also provides various text-type information including bank account inquiries, money transfers, exchange rate information, travel information, traffic information, weather information, leisure information, television programs, news, stock information, and advertising. In addition, the SMS can be utilized in an electronic-billing system or electronic business where credit card companies transmit/receive an approval of a contract through a text message in order to prevent problems related to a credit card from occurring.

FIG. 1 is a schematic diagram of a mobile communication system that provides a SMS.

The mobile communication system providing the SMS includes a transmitting-side mobile communication terminal 110, a transmitting-side radio base station 120, a mobile communication switching center (MSC) 130, a short message centre (SMC) 140, a receiving-side radio base station 150, and a receiving-side mobile communication terminal 160.

The transmitting-side mobile communication terminal 110 can make a wireless phone call with another mobile communication terminal through the mobile communication network, and it generates a short message to be transmitted by using a message generation function and transmits the generated message through the mobile communication network.

The transmitting-side radio base station 120 includes a transmitting-side base station transmission system (BTS) 122, a transmitting-side base station controller (BSC) 124, and an enhancer (not shown), and it transmits location information of the transmitting-side mobile communication terminal 110, registered-user information, and a short message generated by the transmitting-side mobile communication terminal 110 to the MSC 130.

The receiving-side radio base station 150 includes a transmitter 152, a controller 154, and an enhancer, and transmits location information and registered-user information of the receiving-side mobile communication terminal 160 to the mobile communication switching center 130, and transmits the short message that has been generated by the transmitting-side mobile communication terminal 110 and transmitted through the MSC 130 to the receiving-side mobile communication terminal 160.

The MSC 130 performs a control function for efficient operations of the radio base stations 120 and 150 and an interacting function with a switch of a general switched telephone network (GSTN), transmits the short message transmitted through the transmitting-side radio base station 120 to the SMC 140 for storing the short message therein, receives the short message from the SMC 140, and delivers the short message to the receiving-side radio base station 150. When registration of locations of the transmitting-side and receiving-side mobile communication terminals 110 and 160 is performed by the transmitting-side and receiving-side radio base stations 120 and 150, the MSC 130 temporarily stores subscriber information of the transmitting-side and receiving-side mobile communication terminals 110 and 160 with a visitor location register (VLR) in the MSC 130, and then requests registration of the locations of the transmitting-side and receiving-side mobile communication terminals 110 and 160 from a home location register (HLR).

The SMC 140 is connected with the MSC 130 and forwards a short message to mobile communication subscribers. The SMC 140 enables various text message transmission systems (e.g., a PC communication system, a server system, a mobile communication terminal, and so on) to bi-directionally transmit/receive messages (e.g., numbers and characters) to/from subscribers through the mobile communication network. A mobile communication subscriber may transmit a text message through the transmitting-side mobile communication terminal 110. When a text message that has been sent by a transmitting-side mobile communication terminal cannot be directly transmitted to a receiving-side mobile communication terminal 160, the text message is stored in the SMC 140 for a predetermined period of time set by the transmitting-side mobile communication terminal or until the receiving-side mobile communication terminal can receive the message. The message is deleted by the SMC 140 after the receiving-side mobile communication terminal checks the message transmitted from the transmitting-side mobile communication terminal. In addition, when a predetermined time period has passed or when the message cannot be transmitted within an effective time set by the transmitting-side mobile communication terminal, the message is deleted.

The receiving-side mobile communication terminal 160 makes a phone call upon a call request signal transmitted through the mobile communication network, receives a short message from the SMC 140 through the receiving-side radio base station 150, and delivers contents of the message by displaying the short message.

By using the mobile communication system having the above-described configuration, the SMS can be provided between the transmitting-side mobile communication terminal 110 and the receiving-side mobile communication terminal 160.

Since the SMS can be used in a public place (e.g., a meeting room or a conference where the use of a cell phone is forbidden) without disturbing the people around the user, utilization of the SMS is increasing. Particularly, as utilization of short messages has been recently increased, a short message service can be used as a messenger of a wired Internet when the SMS is repeatedly transmitted and received between two users.

However, a method for checking all transmitted/received messages at once is not provided, and therefore a user must select transmitted/received messages one at a time and send a reply for the checked message.

Accordingly, in order to provide a service for checking transmitted/received message at once, a mobile messenger service is provided. However, a user must register with the mobile messenger service and perform a log-in process for the use of the mobile messenger service. Moreover, the use of the mobile messenger service is available only within a limited community. In addition, since the mobile messenger service is provided through a relatively expensive wireless Internet for the mobile messenger, the user prefers the relatively inexpensive SMS.

Accordingly, it is required to provide a short message service that supports real-time message checking without requiring an additional registration process or log-in process, like a messenger.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a mobile communication terminal having a user interface that supports a text chatting message for processing a transmitted/received short message like a messenger and storing short messages transmitted/received through the text chatting mode, and a text chatting service method providing real-time message checking like the messenger without requiring an additional registration process or log-in process by using the mobile communication terminal.

An exemplary mobile communication terminal according to one embodiment of the present invention supports a text chatting service providing a chatting function by using a short message service. The mobile communication terminal includes a program memory, a data storage unit, a key input unit, a display, and a microprocessor. The program memory stores a text chatting program for the text chatting service and a program that performs additional functions executed in the text chatting service. The data storage unit stores a text chatting message transmitted/received through the text chatting service. The key input unit includes a key button for generating the text chatting message. The display displays the transmitted/received text chatting message on a chatting window. The microprocessor executes the text chatting program and performs a control function to display text chatting messages communicated with a mobile communication terminal of an opposite party on the chatting window. Herein, the text chatting message is transmitted/received by using a short message service.

An exemplary method according to another embodiment of the present invention provides a text chatting service by transmitting a text chatting message from a mobile communication terminal that provides a chatting function by using a short message service. The method includes: (a) displaying a chatting window by setting a text chatting mode for the text chatting service; (b) selecting a chatting contact to be using the text chatting service and generating a text chatting message to be transmitted to the chatting contact; (c) transmitting the text chatting message to be transmitted by using the short message service; (d) determining whether a received text chatting message is received in response to the transmitted text chatting message, and displaying the received text chatting message when the received text chatting message is received; (e) determining whether a termination signal for terminating the text chatting service is input from a user, terminating the text chatting service when the termination signal is input, and generating a response message for the received text chatting message and repeating from the step (c) when the termination signal is not input.

An exemplary method according to another embodiment of the present invention provides a text chatting service by receiving a text chatting message from a mobile communication terminal that provides a chatting function using a short message service. The method includes: (a) receiving a received text chatting message for the text chatting service through a mobile communication network; (b) displaying a chatting window by setting the mobile communication terminal to a text chatting mode for the text chatting service; (c) displaying a received text chatting message on a chatting window; (d) when a response message generation request message is received for the received text chatting message from a user of the mobile communication terminal, generating and transmitting a text chatting message to be transmitted according to the response message generation request signal; (e) determining whether a text chatting message is additionally received through the mobile communication network, and repeating from the step (c) when the text chatting message is additionally received; and (f determining whether a text chatting service termination signal is input from a user, terminating the text chatting service when the termination signal is input, and repeating from the step (e) when the termination signal is not input.

BRIEF DESCRIPTION OF THE DRAWINGS

FIG. 1 is a schematic diagram of a mobile communication system providing a short message service.

FIG. 2 is a schematic block diagram of a mobile communication terminal supporting a chatting function according to an exemplary embodiment of the present invention.

FIG. 3 is a schematic block diagram of a chatting module installed in a microprocessor of the mobile communication terminal according to the exemplary embodiment of the present invention.

FIG. 4 is a graph showing an interrupt processing method in the case that a short message or a multimedia message is received, or a voice call is received while a chatting message service is provided according to the exemplary embodiment of the present invention.

FIG. 5 shows a structure of chatting message data stored in a data storage unit according to the exemplary embodiment of the present invention.

FIG. 6 is a flowchart of a chatting service process in the case of transmitting a chatting message according to the exemplary embodiment of the present invention.

FIG. 7 is a flowchart of a chatting service process in the case of receiving a chatting message according to the exemplary embodiment of the present invention.

FIG. 8 exemplarily shows a mobile communication terminal providing a chatting service according to the exemplary embodiment of the present invention.

FIG. 9 and FIG. 10 exemplarily show a chatting service method between multiple users according to the exemplary embodiment of the present invention.

FIG. 11 exemplarily shows a method for calling up chatting message data stored in the mobile communication terminal according to the exemplary embodiment of the present invention.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" and "comprising", will be understood to imply the inclusion of stated elements but not the exclusion of any other elements.

Further, throughout this specification and the claims which follow, each block is a unit that performs a specific function or operation, and can be realized by hardware or software, or a combination of both.

FIG. 2 is a block diagram of a mobile communication terminal supporting a chatting function according to an exemplary embodiment of the present invention.

The mobile communication terminal supporting the text chatting function includes a program memory 202, a data storage unit 204, a key input unit 206, a display 208, a voice input/output unit 210, a subscriber information storage unit 212, a microprocessor 214, a baseband converter 216, a radio frequency (RF) signal processor 218, and an antenna 220.

The program memory 202 stores protocol software that processes a short message transmitted/received to/from the mobile communication terminal, and stores a text writing program that displays a text writing window on the display 208 when a text writing menu is selected from among a plurality of menus. In addition, the program memory 202 stores programs for a text chatting service and additional functions (e.g., selecting a contact, adding a contact, deleting a contact, changing a user name, storing text chatting message data, displaying stored text chatting message data, etc.).

The data storage unit 204 buffers data when an operation program of the mobile communication terminal is executed, and stores characters or numbers input through the key input unit 206 or stores text data or image date received by the mobile communication terminal. In addition, the data storage unit 204 stores data such as phone numbers for providing a short message service and performing a voice call operation. When the text chatting service is terminated, text chatting message data including text chat contents is stored in the data storage unit 204. A chatting message data structure and a storing method will be described in further detail with reference to FIG. 5.

The key input unit 206 includes a number key for entering a number (e.g. a phone number), a key button for entering a character, and a menu selection button. The key input unit 206 includes a special key for generating and transmitting a short message and checking a received short message. The special key can be provided as a message key ("✉" key in FIG. 8) or as various types of keys in the mobile communication terminal according to the exemplary embodiment of the present invention.

The display 208 displays an operation status of the mobile communication terminal, and displays a chatting message generated and transmitted by the mobile communication terminal and a chatting message received from a mobile communication terminal of a chatting contact of the user through one chatting window. The operation status includes a power state, received signal strength, date, and time.

The voice input/output unit 210 is formed of a microphone and a speaker, and performs a voice output operation of a called party and a voice input operation of a calling party by converting an analog signal into a digital signal through the microphone and converting the digital signal into an analog signal through the speaker when a voice call is established. In addition, the voice input/output unit 210 outputs a sound signal to inform of arrival of a message when a short message or a multimedia message is received through the mobile communication network.

The subscriber identity module (SIM) 212 stores subscriber registration information. The subscriber registration information includes a unique number allocated to each subscriber's terminal in the mobile communication network, and the SIM 212 is provided in the form of a card to be inserted. The SIM 212 is well known to a person skilled in the art, and therefore further description will be omitted.

The microprocessor 214 controls a received contents displaying function when a text chatting message is received through the mobile communication network, invokes a text chatting program from the program memory 202 so as to use the text chatting service, receives a short message input through the key input unit 206, displays the input short message on a chatting window of the display 208, and transmits a chatting message to the baseband converter 214. In addition, when a short message for the text chatting service is received through the mobile communication network, the microprocessor 214 controls the chatting window of the display 208 to display the short message. For this purpose, the microprocessor 214 must includes a chatting module for providing the text chatting service according to the exemplary embodiment of the present invention. Herein, a structure of the chatting module will be described in further detail with reference to FIG. 3.

The baseband converter 216 converts a signal transmitted/received through the RF signal processor 218 into a baseband signal, and performs digital to analog conversion and analog to digital conversion. In addition, the baseband converter 216 transmits a chatting message for the chatting service to the RF signal processor 216, and automatically controls power of the RF signal processor 218 or a power gain. Further, the baseband converter 215 receives the text chatting message received by the RF signal processor 218.

The RF signal processor 218 demodulates and amplifies an RF signal received through an antenna 220 from the radio base station, and modulates a text chatting message signal applied from the baseband converter 216, and the antenna 220 transmits/receives a radio signal to/from the radio base station.

FIG. 3 is a schematic block diagram of a chatting module installed in the microprocessor of the mobile communication terminal according to the exemplary embodiment of the present invention.

The chatting module 300 according to the exemplary embodiment of the present invention includes an additional function execution module 310, a chatting contents storing module 320, an interrupt handling module 330, and a chatting window setting module 340, and the chatting window setting module 340 includes a default screen setting module 342, a user display screen setting module 344, and a message display module 346.

The additional function execution module 310 performs additional functions such as selecting a contact, adding/deleting a contact, changing a user name, etc., while using the text chatting service. The additional function execution module 310 invokes and executes an additional function execution program stored in the program memory 202 and performs the additional functions when receiving an additional function request through the key input unit 206.

The chatting contents storing module 320 integrates and stores transmitted/received chatting messages in the form of a log text when the text chatting service according to the exemplary embodiment of the present invention is terminated. Herein, the data integrated in the form of text will be called "text chat message data". In addition, when a user requests to display stored chat message data, the chatting contents storing module 320 calls up text chat message data stored in the data storage unit 204 and displays the text chat message data on the display 208.

The interrupt handling module 330 selects a job having the highest priority over other jobs in the mobile communication terminal, and processes the selected job when a short message, a multimedia message, or a voice call incoming signal occurs while using the SMS. For this purpose, the mobile communication terminal stores an interrupt handling process table for prioritizing jobs in the storage unit 204. The interrupt handling process table will be described in further detail with reference to FIG. 4.

The chatting window setting module 340 generates a chatting window displayed on the display 208 of the mobile communication terminal for the text chatting service.

The default screen setting module 342 of the chatting window setting module 340 sets a default screen of a chatting window, and the default screen includes a title display area, a message display area, a message input area, a menu area, and a scroll area. The title display area is located in an upper portion of the chatting window and displays a title. A phone number or a user name (i.e., nickname) of an opponent party, or a predetermined title may be displayed as a chatting title on the title display area. The message display area displays a transmitted/received message, and the message input area displays a message to be transmitted that is input through the key input unit 206 by a user. The menu area includes menu buttons for additional services that can be used by the user while using the text chatting service, a send button for transmitting an input message, and a character button for selecting an input character type (e.g., Korean characters, English uppercase characters, English lowercase characters, numbers, special characters, etc.). In addition, the scroll area displays a scroll button for scrolling down a screen when the length of a message exceeds the screen size. In this case, a status display area for displaying the status of a mobile communication terminal may be provided in an upper portion of the chatting window.

The user display setting module 344 displays a user of the mobile communication terminal and performs a chatting operation by transmitting/receiving a chatting message, and the user can be displayed by using a phone number, a symbol, an icon, or a nickname. In addition, a phone number, a symbol, an icon, a nickname, and message contents of each user may be respectively displayed using various colors for identifying each user.

The message display module 346 displays contents of a transmitted/received chatting message, and the contents can be displayed by using various colors for identifying each user.

FIG. 4 is a table showing an interrupt handling process in the case that a short message, a multimedia message, or a voice incoming call is received while using the SMS according to the exemplary embodiment of the present invention.

When a short message, a multimedia message, or voice call incoming signal is received while processing a chatting message through the chatting message service according to the present invention, the interrupt handing module 330 should set job priority of the mobile communication terminal. The job priority is set in the interrupt handling process table, and the table is stored in the data storage unit 204.

When the mobile communication terminal is in the status of transmitting a text chatting message or receiving a text chatting message, or in the idle state while using the text chatting service, the mobile communication terminal performs a different process when a short message, a multimedia message, or a voice call incoming signal is received.

When the short message is received while using the chatting service according to the exemplary embodiment of the present invention, the short message is received as in a conventional receiving process and an icon is displayed to inform an arrival of the short message, regardless of a current status of the mobile communication terminal. Herein, the current status of the mobile communication status may include a chatting message transmission status, a chatting message receiving status, and an idle status.

When a multimedia message is received while using the chatting service, an operation of the mobile communication terminal may differ depending on whether or not the mobile communication terminal supports receiving of a multimedia message.

When the mobile communication terminal does not support receiving of the multimedia message, the multimedia message is stored in a server of the mobile communication network and a signal informing of the arrival of the multimedia message is transmitted to the mobile communication terminal.

When a multimedia message service (MMS) incoming message is transmitted to notify of arrival of a pull-type multimedia message that is set for the mobile communication terminal to fetch data, an icon is displayed for notifying of arrival of the multimedia message, regardless of the status of the mobile communication terminal. Herein, the current status of the mobile communication status may include a chatting message transmission status, a chatting message receiving status, and an idle status.

When an MMS incoming message is transmitted to notify of arrival of a push-type multimedia message that is set to a message to the mobile communication terminal, a process for drawing out the multimedia message is performed, regardless of the status of the mobile communication terminal.

When the mobile communication terminal supports the receiving of a multimedia message, an operation of the mobile communication system may differ depending on whether the mobile communication system is synchronous or asynchronous. When the mobile communication system is asynchronous (e.g., wireless code division multiplexing access, WCDMA), the mobile communication terminal is provided as a WCDMA terminal, and therefore the WCDMA terminal receives a multimedia message while transmitting/receiving a text chatting message. However, when the mobile communication terminal is in the waiting status, the mobile communication terminal displays an icon to inform of arrival of a multimedia message after receiving the multimedia message.

When the mobile communication terminal is synchronous (e.g., CDMA 1X, 2G, EV-DO), a user performs a pop-up operation for a multimedia message while simultaneously pressing a transmission key for transmitting a text chatting message when the multimedia message is received while transmitting the text chatting message. In addition, when the multimedia message is received while receiving a text chatting message, the text chatting message and the multimedia message are simultaneously received, and when the mobile communication terminal is in the idle status, an icon is displayed for informing of the arrival of the multimedia message after receiving the multimedia message.

When an incoming voice call is received while using the SMS, the mobile communication terminal stops the SMS and process the incoming voice phone call. When the voice call is terminated, the mobile communication terminal returns to the text chatting service.

FIG. 5 shows a structure of text chatting message data stored in the data storage unit according to the exemplary embodiment of the present invention.

When the text chatting service is terminated, a transmitted text chatting message and a received text chatting message displayed on the chatting window are stored as one chatting message data set. Conventionally, a short message consumes a large amount of storage space since a transmitted message and a received message are separately stored. However, according to the exemplary embodiment of the present invention, text chatting message data is stored in a form that is similar to a message log of a typical computer such that transmitted/received messages are stored as one text chatting message data set.

Text chatting message data is stored in the form of text using a log method. The size of the text chatting message data varies depending on the amount of transmitted/received text chatting messages. In this case, a user may add a title to the stored text chatting message data for identifying the corresponding data.

Each mobile communication terminal may have a different amount of text chatting message data that can be stored, depending on the manufacturer. In the present embodiment, the size of the chatting message data is limited to 1 Kbyte, and the mobile communication terminal stores 100 chatting messages.

The size of one text chatting message is limited to 1 Kbyte, and therefore when the amount of transmitted/received message contents to be stored exceeds 1 Kbyte, the exceeding amount of data is stored in the next data field and connection information is additionally stored so as to check a connection of the data. In addition, when the text chatting message data is called up, the connection information is set to call up contents stored in the next data field.

For example, assume that the size of text chatting message data stored in a data field of Record #3 exceeds 1 Kbyte and thus an exceeding amount of contents is stored in a data field of Record #4. When a user calls up the text chatting message data stored in the data field of Record #3, text chatting message contents stored in the Record #3 and Record #4 are connected and displayed on the display 208 of the mobile communication terminal.

Each of the text chatting message data sets stores a chatting start date, chatting contact information, chatting contents, and a chatting end date. In this case, the chatting end data can be omitted, and storing information may vary depending on a manufacturer of the mobile communication terminal.

In FIG. 5, Record #99 and Record #100 denote empty data fields, and the empty data field may not be displayed or may be displayed as a 1 Kbyte empty data field.

FIG. 6 is a flowchart of a text chatting service process performed in accordance with text chatting message transmission according to the exemplary embodiment of the present invention.

In order to use the text chatting message service, a user selects a text chatting menu by selecting a menu installed in the mobile communication terminal. When the text chatting menu is selected, the mobile communication terminal is changed into a text chatting mode and a chatting window is displayed, in step S600.

When the chatting window is displayed, the user selects a text chatting contact by using a menu button displayed on the menu area. The text chatting contact can be selected by searching for a phone number, searching through recent call records, or directly entering a phone number. In this case, more than two contacts can be selected, in step S610.

When the text chatting contact is selected, a text chatting message to be transmitted is input through the key input unit. The input text chatting message is displayed on a chatting message input area of the chatting window. In this case, the size of the input text chatting message may be limited by the manufacture of the mobile communication terminal or a mobile communication service provider, in step S620.

When input of the text chatting message is completed, the user transmits the text chatting message to the contact selected in step S610 by using the send button on the menu area or a separately provided key input unit. In this case, the text chatting message is transmitted in the form of a short message. In addition, the transmitted text chatting message is displayed on the chatting message display area of the chatting window, in step S630.

When a chatting message is received from the contact after a chatting message is transmitted in step S640, the received chatting message is displayed on the chatting message display area of the chatting window, in step S650.

When the user generates a text chatting message and presses a send button or a send key, responding to the chatting message received from the contact, the above process is repeated from step S630 so as to transmit a short message type of chatting message and receive the text chatting service, in step S660.

However, when the text chatting message is terminated in step S670 without responding to the received chatting message, the mobile communication terminal generates text chatting message data in a log-type text format for the transmitted/received chatting messages and stores the log-type chatting message data in the data storage unit 204.

When message data of the same contact is stored in the data storage unit 204, the current text chatting message data can be stored in connection with the previously stored text chatting message data. In this case, a message window is displayed to determine whether to store the current text chatting message data in connection with the previous data or separately store the current data such that the user can select a user-desired storing method, in step S680.

The mobile communication terminal determines whether a text chatting message is received from the chatting contact for a predetermined time period after terminating the text chatting mode, in step S690.

When a text chatting message is received within the predetermined time period, the mobile communication terminal is changed to the text chatting mode and displays the received text chatting message together with stored text chatting message data by calling up the stored text chatting message data, and performs the above-stated processes from the step S650, in step S692.

The selecting of the text chatting contact (S610) and the inputting of the text chatting message (S620) may be switched depending on the manufacturer of the mobile communication terminal or the mobile communication service provider.

FIG. 7 is a flowchart of a text chatting service process performed in accordance with receiving of a text chatting message according to the exemplary embodiment of the present invention.

When a mobile communication terminal set in a call waiting mode receives a text chatting message in step S700, a message window is displayed to determine whether to change the mobile communication terminal into the text chatting mode, together with a message for notifying of receipt of the text chatting message. In this case, the mobile communication terminal may be automatically changed to the text chatting mode when a text chatting message is received, depending on the manufacturer of the mobile communication terminal or the mobile communication service provider, in step S710.

When the user of the receiving-side mobile communication terminal does not change the mobile communication terminal to the text chatting mode, the mobile communication terminal processes the text chatting message as in the case of receiving a typical short message. That is, when the text chatting message is displayed on the screen window and the user of the receiving-side mobile communication terminal generates a short message, the short message is transmitted through a typical short message transmission process, in step S712.

However, when the user of the receiving-side mobile communication terminal changes the mobile communication terminal to the text chatting mode, the mobile communication terminal is changed to the text chatting mode and the received text chatting message is displayed on the chatting window, in step S270.

When the user of the receiving-side mobile communication terminal generates a text chatting message, in response to the received text chatting message in step S720, the text chatting message is input through the chatting window and the input text chatting message is transmitting through the SMS, in step S740.

After that, when an additional text chatting message is received from a user of the transmitting-side mobile communication terminal, the above-processes are performed from step S720.

After step S730, when the user of the receiving-side mobile communication terminal terminates the text chatting mode in step S760, text chatting message data is generated in the log-type text for the transmitted/received text messages and the text chatting message data is generated in the data storage unit 204.

In this case, when text chatting message data of the same chatting contact has been stored, the current text chatting message data may be stored in connection with the previously stored text chatting message data. In this case, a message window may be displayed to determine whether to store the current text chatting message data in connection with the previous data or separately store the current text chatting message data so that the user can select a user-desired storing method through the message window, in step S770.

The receiving-side mobile communication terminal checks whether an additional text chatting message is received within a predetermined time period after terminating the text chatting mode in step S780, sets the mobile communication terminal to the text chatting mode when the additional text chatting message is received within the predetermined time period, calls up stored text chatting message data, displays the called up data with the receiving text chatting message, and performs the above-stated processes from step S720, in step S782.

Through the above-stated processes, the mobile communication terminal can use the text chatting service by using the SMS.

FIG. 8 exemplarily shows a mobile communication terminal that provides a text chatting service according to the exemplary embodiment of the present invention.

A user who wants to use a text chatting service according to the exemplary embodiment of the present invention displays an additional service selection screen 8A through a menu installed in the mobile communication terminal. The user selects a text chatting menu from the additional service selection screen 8A by using the key input unit, and selects a menu (i.e. "1. Send new message") from a screen 8B so as to start the text chatting service. When the text chatting start menu is selected, a screen for selecting a contact is displayed on the mobile communication terminal. The contact can be selected by searching for a phone number, searching through recent call lists, or directly entering a phone number of the contact. When the contact is selected from a contact list screen 8C displayed on the mobile communication terminal, a chatting window 8D to which a text message to be sent is input is displayed. In this case, it is possible to display the contact list screen 8C after displaying the chatting window 8D.

A screen 8E displays a text chatting message input to the chatting window to be transmitted and a response message received from the selected contact. When the user enters a text message through a chatting message input area of the chatting window and presses a send button, a message window 8F is displayed to show a transmission progress. When the transmission is completed, a transmitted message is displayed on a chatting message display area 8G.

When the user terminates the text chatting service, a screen 8H is displayed to determine whether or not the user wants to store a transmitted/received message, and when the user wants to store the message, text-type chatting message data is generated and stored in the data storage unit 204.

Such a text chatting service supports one-to-one chatting as well as multiple user chatting.

FIG. 9 exemplarily shows a mobile communication terminal for describing a process for adding another user during one-to-one chatting while using the text chatting service.

When a third party is added while using the text chatting service as shown in a screen 9A, a user of the transmitting-side mobile communication terminal or the receiving-side mobile communication terminal selects a menu button in a menu area. When the menu button is selected and a menu for adding a contact is selected from among various menus displayed on the screen, a screen 9B is displayed for selecting a method for adding a contact. In the present embodiment, the mobile communication terminal supports adding the contact by searching for a phone number, searching through a recent call list, or directly entering a phone number of the contact.

When the user selects the contact by searching for a phone number, a phone number list is displayed. An input window for searching for the phone number may be displayed. When the user selects a contact to be added by searching through the phone number list or searching for the phone number, a screen 9C-1 is displayed.

When the user adds the contact by searching through the recent call list from the screen 9B, the recent call list is displayed on a screen 9C-2 and the user selects a phone number of the contact by using a direction key or a number key.

When the user selects the contact to be added by directly entering the phone number of the contact in the screen 9B, a window to which the phone number is entered is displayed on a screen 9C-3 and the user enters the phone number of the contact in a phone number input window by using the number key.

When the user selects the contact to be added through the windows 9C-1, 9C-2, and 9C-3, a screen 9D is display to inform that the selected contact is successfully added.

When the addition process of adding a contact is completed, the text chatting service can be provided between multiple users.

FIG. 11 exemplarily shows a mobile communication terminal for transmitting a text chatting message to multiple users according to the exemplary embodiment of the present invention.

When a user among multiple users receiving the text chatting service enters a message to be transmitted in the chatting message input area (i.e. screen 9E) and then inputs a send button, a screen 9F is displayed to inform that the message is being transmitted. In the screen 9F, "½" indicates that the message is being transmitted to the first text chatting contact of two text chatting contacts.

When the transmission of the message to the two text chatting contacts is completed, a screen 9G is displayed.

When the transmission of the message to the two text chatting contacts has failed, a message window 9H-1 is displayed to inform a transmission failure. Then, it is determined whether to retransmit the message through the message window 9H-1. When the retransmission has failed, a transmission failure message is displayed on the chatting window as shown in 9H-2.

When the transmission of the message to only one of the two chatting contacts has failed, it is preferred to display an identifier or a phone number of the failed chatting contact, together with the transmission failure message.

Through the above-described processes, the text chatting service can be provided between multiple users.

When the text chatting service is terminated, transmitted/received messages are converted into text-type chatting message data and stored in the data storage unit 204. In addition, the user of the mobile communication terminal calls up the stored text chatting message data to check transmitted/received messages.

FIG. 11 exemplarily shows a mobile communication terminal for describing a process of calling up text chatting message data stored in the mobile communication terminal according to the exemplary embodiment of the present invention.

In order to call up text chatting message data from the data storage unit 204, the user displays an additional service selection screen 10A by using the menu installed in the mobile communication terminal.

The user selects a text chatting menu from the additional service selection screen 10A by using the key input unit, and selects a menu (i.e., "2. Text chatting storage") from a screen 10B for managing text chatting message data.

When the menu for managing the chatting message data is selected, a title or a part of the stored text chatting message is listed on the screen window. The user selects a message to be displayed from the displayed text chatting message list.

In this case, the user may extract a text message list of desired-category among a plurality of text chatting message lists displayed through search menus.

When the user selects a menu button (Execution key 1, Execution key 2, or Execution key 3 in the screen 10B), the corresponding list is displayed. A screen 10C displays a user-specific category list for selecting stored text chatting message for each user. When a user named "pretty girl" is selected through the screen 10C, text chatting messages communicated with the selected user are displayed as shown in a screen 10D.

The user selects a text chatting message to be displayed by using a direction key or a number key, and contents of the selected text chatting message are displayed on a screen 10E.

Through the above-stated processes, the user can call up and check the text chatting messages stored in the mobile communication terminal.

In this case, FIG. 8 to FIG. 11 exemplarily show the screens of the mobile communication terminal, and the screens may be variously changed depending on the manufacturer of the mobile communication terminal or the mobile communication service provider.

The above-described exemplary embodiments of the present invention can be realized not only through a method and an apparatus, but also through a program that can perform functions corresponding to configurations of the exemplary embodiments of the present invention or a recording medium storing the program, and this can be easily realized by a person skilled in the art.

As described, according to the present invention, a text chatting service that supports real-time message checking can be realized by simply changing a user interface of the mobile communication terminal by using a conventional short message without performing an additional registration process or a log-in process. Accordingly, a user can check transmitted/received short messages through one screen window, and provide a cost reduction by using a relatively less expensive short message service than a data charge.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mobile communication terminal that supports a text chatting service providing a chatting function by using a short message service, the mobile communication terminal comprising:
    a program memory configured to store a text chatting program for the test chatting service and a program configured to perform additional functions executed in the text chatting service;
    a data storage unit configured to store a text chatting message that is transferred through the text chatting service;
    a key input unit including a key button for generating the text chatting message;
    a display configured to display the text chatting message in a chatting window; and
    a microprocessor configured to execute the text chatting program and perform a control function to display text chatting messages communicated with a mobile communication terminal of a chatting contact in the chatting window, the text chatting message transferred by using the short message service,
    wherein the text chatting messages communicated with the mobile communication terminal of the chatting contact and an input chatting message to be transferred to the chatting contact that is input by a user are displayed together in the chatting window,
    wherein the mobile communication terminal terminates a text chatting mode for the text chatting service, stores the text chatting message transferred through the text chatting service in the data storage unit, wherein the mobile communication determines whether a received text chatting message is received within a predetermined time period, sets the mobile communication terminal to the text chatting mode and displays the text chatting message stored in the data storage unit on the display when the received text chatting message is received within the predetermined time period.

2. The mobile communication terminal of claim 1, wherein the microprocessor calls up the text chatting program from the program memory and executed the text chatting program when the text chatting message is received from a remote mobile communication terminal of the chatting contact through the short message service, and initiates the text chatting program from the program memory and executes the text chatting program when a text chatting program execution request is input from the user of the mobile communication terminal through the key input.

3. The mobile communication terminal of claim 1, wherein the microprocessor comprises:
   an additional function execution module for performing an additional function executed in the text chatting service;
   a chatting contents storing module configured to generate text chatting message data for storing the text chatting messages transferred through the text chatting service and configured to store the text chatting message data in the data storage unit, and retrieve text chatting message data from the storage unit; and
   a chatting window setting module configured to set a chatting window for the text chatting service.

4. The mobile communication terminal of claim 3, wherein the additional function execution module performs at least one of selecting a chatting contact, adding and deleting a chatting contact, and changing a user name, while using the text chatting service.

5. The mobile communication terminal of claim 3, wherein the chatting contents storing module generates the text chatting message data by integrating a transmitted text chatting message and a received text chatting message in the text chatting service into a log-type text.

6. The mobile communication terminal of claim 5, wherein the text chatting message data includes contents of the text chatting message, and additionally stores at least one of a chatting start date, chatting contact information, and a chatting end date.

7. The mobile communication terminal of claim 3, wherein the chatting window setting module comprises at least one of:
   a default screen setting module configured to set a default screen of the chatting window, including a chatting title display area, a chatting message display area, a menu area, and a scroll area;
   a user display screen setting module configured to display the user using the text chatting message service; and
   a message display module configured to display contents of the text chatting messages.

8. The mobile communication terminal of claim 7, wherein the menu area comprises:
   a menu button for selecting an additional function to be executed in the text chatting service;
   a send button for transmitting the input chatting message; and
   a character button for selecting a text input format for generating the text chatting message.

9. The mobile communication terminal of claim 7, wherein the user display screen setting module and the message display module display each user by using a different color to distinguish each user.

10. The mobile communication terminal of claim 3, wherein the user microprocessor additionally comprises an interrupt handling module configured to process at least one of a short message, a multimedia message, and a voice call incoming signal received while using the text chatting service.

11. The mobile communication terminal of claim 1, wherein the mobile communication terminal further comprises at least one of:
   a voice input/output unit configured to perform a sound signal output function for informing arrival of the text chatting message, and an opponent party's voice output function and a caller's voice input function during a voice call;
   a subscriber information storage unit configured to store information about a subscriber of the mobile communication terminal;
   a radio frequency (RF) signal processor configured to modulate the text chatting message into an RF signal for transferring through a mobile communication network; and
   an antenna configured to transfer the RF signal through the mobile communication network.

12. A method for providing a text chatting message from a mobile communication terminal that provides a chatting function by using a short message service, the method comprising:
   (a) displaying a chatting window by setting a text chatting mode for the text chatting service;
   (b) selecting a chatting contact to use the text chatting service and generating a text chatting message to be transmitted to the chatting contact;
   (c) transmitting the text chatting message by using the short message service;
   (d) determining whether a received text chatting message is received, responding to the transmitted text chatting message, and displaying the received text chatting message when the received text chatting message is received; and
   (e) determining whether a termination signal for terminating the text chatting service is input from a user, terminating the text chatting service when the termination signal is input and:
   if so:
   (e1) terminating the text chatting mode and storing the text chatting message transferred through the text chatting service, and terminating the text chatting service, and
   (e2) determining whether the received text chatting message is received within a predetermined time period, and setting the mobile communication terminal to the text chatting mode and displaying the stored text chatting message when the received text chatting message is received within the predetermined time period, or,
   if not:
   (e3) generating a response message for the received text chatting message and repeating from the step (c) when the termination signal is not input, and
   wherein the text chatting message communicated with the mobile communication terminal of the chatting contact and an input chatting message to be transferred to the chatting contact that is input by the user are displayed together in the chatting window.

13. The method of claim 12, wherein (e2) comprises storing the text chatting message and the received message by integrating the text chatting message into a log-type text.

14. The method of claim 12, wherein (a) comprises setting the mobile communication terminal to the text chatting mode when a text chatting menu is selected from among a plurality of additional functions installed in the mobile communication terminal.

15. The method of claim 12, wherein (b) further comprises selecting a contact to which the text chatting message is transmitted.

16. The method of claim 15, wherein the selecting of the contact is performed by searching for a phone number, searching through a recent call record list, or directly entering a phone number of the contact.

17. The method of claim 12, wherein (b) comprises simultaneously transmitting the text chatting message to more than two contacts.

18. A method for providing a text chatting service by receiving a text chatting message from a mobile communication terminal that provides a chatting function using a short message service, the method comprising:
- (a) receiving a received text chatting message for the text chatting service through a mobile communication network;
- (b) displaying a chatting window by setting the mobile communication terminal to a text chatting mode for the text chatting service;
- (c) displaying the received text chatting message in a chatting window;
- (d) when a response message generation request message is received for the received text chatting message from a user of the mobile communication terminal, generating and transmitting a transmitted text chatting message according to the response message generation request message;
- (e) determining whether the received text chatting message is additionally received through the mobile communication network, and repeating from step (c) when the received text chatting message is additionally received; and
- (f) determining whether a text chatting service termination signal is input from the user, terminating the text chatting service when the termination signal is input, and repeating from the step (e) when the termination signal is not input, wherein, when the termination signal is input in (f), the method comprises:
- (g1) terminating the text chatting mode; and
- (g2) storing the text chatting messages transferred through the text chatting service, wherein, after (g2), the method further comprises determining whether the received text chatting message is received within a predetermined time period, setting the mobile communication terminal to the text chatting mode and displaying the stored text chatting message when the received text chatting message is received within the predetermined period wherein text chatting messages communicated with the mobile communication terminal of a chatting contact and an input chatting message to be transferred to the chatting contact that is input by the user are displayed together in the chatting window.

19. The method of claim 18, wherein (g2) comprises storing the transmitted text chatting message and the received text chatting message by integrating the text chatting messages into a log-type text.

20. The method of claim 18, wherein (b) comprises receiving information on whether or not to change the mobile communication terminal to the text chatting mode by displaying information on an arrival of the received text chatting message in the chatting window and setting the mobile communication terminal to be automatically changed to the text chatting mode when the received text chatting message is received.

21. The method of claim 20, wherein when the user does not change the mobile communication terminal to the text chatting mode, the received text chatting message is displayed according to a typical short message displaying period.

* * * * *